US009781043B2

(12) United States Patent
Kumar et al.

(10) Patent No.: US 9,781,043 B2
(45) Date of Patent: Oct. 3, 2017

(54) IDENTIFICATION OF INTERNAL DEPENDENCIES WITHIN SYSTEM COMPONENTS FOR EVALUATING POTENTIAL PROTOCOL LEVEL DEADLOCKS

(71) Applicant: NETSPEED SYSTEMS, San Jose, CA (US)

(72) Inventors: Sailesh Kumar, San Jose, CA (US); Eric Norige, East Lansing, MI (US); Joji Philip, San Jose, CA (US); Joseph Rowlands, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 235 days.

(21) Appl. No.: 14/010,237

(22) Filed: Aug. 26, 2013

(65) Prior Publication Data

US 2015/0016257 A1    Jan. 15, 2015

Related U.S. Application Data

(63) Continuation-in-part of application No. 13/942,332, filed on Jul. 15, 2013, now abandoned.

(51) Int. Cl.
*H04L 12/801*  (2013.01)
*H04L 12/705*  (2013.01)
*H04L 12/751*  (2013.01)

(52) U.S. Cl.
CPC .............. *H04L 47/16* (2013.01); *H04L 45/18* (2013.01); *H04L 45/10* (2013.01)

(58) Field of Classification Search
None
See application file for complete search history.

(56) References Cited

U.S. PATENT DOCUMENTS 4,933,933 A * 6/1990 Dally et al. .................. 370/406
5,432,785 A    7/1995 Ahmed et al.
(Continued)

FOREIGN PATENT DOCUMENTS

| CN | 103684961 A | 3/2014 |
| WO | 2014059024 A1 | 4/2014 |

OTHER PUBLICATIONS

HiRA: A Methodology for Deadlock Free Routing in Hierarchical Networks on Chip; Shashi Kumar et al. (978-1-4244-4143-3/09 2009 IEEE).*

(Continued)

*Primary Examiner* — Jeffrey M Rutkowski
*Assistant Examiner* — Ning Li
(74) *Attorney, Agent, or Firm* — Procopio, Cory, Hargreaves & Savitch LLP

(57) ABSTRACT

Systems and methods for automatically building a deadlock free inter-communication network in a multi-core system are described. The example implementations described herein involve automatically generating internal dependency specification of a system component based on dependencies between incoming/input and outgoing/output interface channels of the component. Dependencies between incoming and outgoing interface channels of the component can be determined by blocking one or more outgoing interface channels and evaluating impact of the blocked outgoing channels on the incoming interface channels. Another implementation described herein involves determining inter-component communication dependencies by measuring impact of a deadlock on the blocked incoming interface channels of one or more components to identify whether a dependency cycle is formed by blocked incoming interface channels.

18 Claims, 17 Drawing Sheets

(56) References Cited

U.S. PATENT DOCUMENTS

| | | | |
|---|---|---|---|
| 5,764,740 A | 6/1998 | Holender | |
| 5,867,399 A * | 2/1999 | Rostoker | G01R 31/31704 714/E11.167 |
| 5,991,308 A | 11/1999 | Fuhrmann et al. | |
| 6,003,029 A | 12/1999 | Agrawal et al. | |
| 6,195,703 B1 * | 2/2001 | Blumenau et al. | 709/238 |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 8,898,396 B2 * | 11/2014 | Mejdrich | H04L 49/109 711/147 |
| 8,976,802 B2 * | 3/2015 | Koka et al. | 370/413 |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0006584 A1 * | 1/2004 | Vandeweerd | G06F 9/5066 718/107 |
| 2004/0216072 A1 | 10/2004 | Alpert et al. | |
| 2005/0147081 A1 | 7/2005 | Acharya et al. | |
| 2005/0228930 A1 * | 10/2005 | Ning et al. | 710/306 |
| 2005/0286543 A1 * | 12/2005 | Coppola et al. | 370/403 |
| 2006/0161875 A1 | 7/2006 | Rhee | |
| 2007/0118320 A1 | 5/2007 | Luo et al. | |
| 2007/0189283 A1 * | 8/2007 | Agarwal et al. | 370/388 |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 * | 12/2009 | Murali et al. | 716/6 |
| 2010/0040162 A1 | 2/2010 | Suehiro | |
| 2010/0211718 A1 * | 8/2010 | Gratz et al. | 710/317 |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0191088 A1 * | 8/2011 | Hsu | G06F 17/50 703/13 |
| 2011/0191774 A1 * | 8/2011 | Hsu | G06F 17/50 718/100 |
| 2011/0243147 A1 * | 10/2011 | Paul | 370/401 |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0028083 A1 * | 1/2013 | Yoshida | H04L 49/60 370/230 |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0294458 A1 * | 11/2013 | Yamaguchi | G06F 15/7825 370/412 |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Deadlock Free Routing in Mesh Networks on Chip with Regions by Richard Holsmark; Sep. 2009 SBN 978-91-7393-559-3.*

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

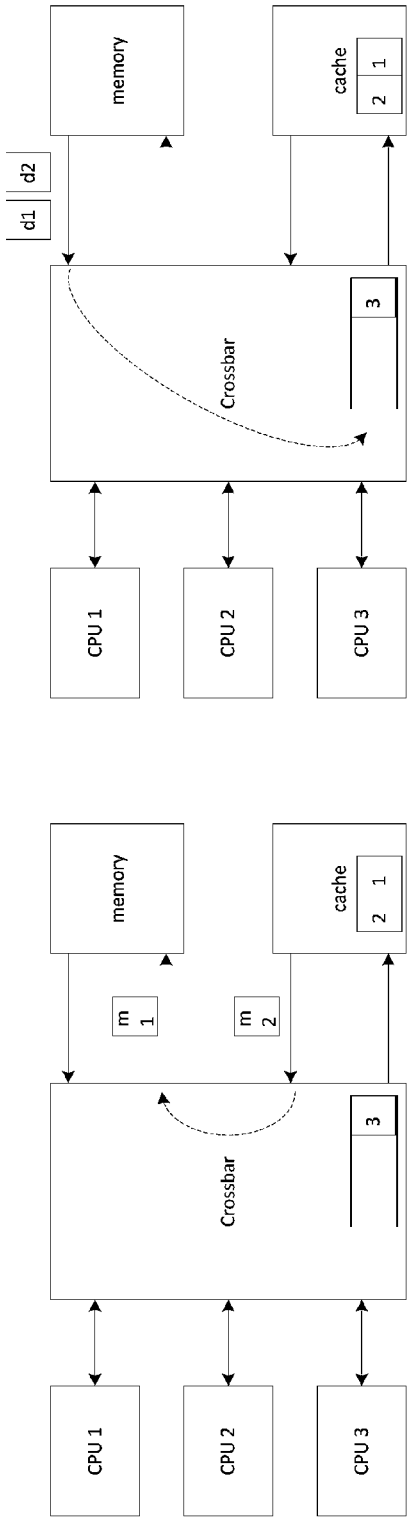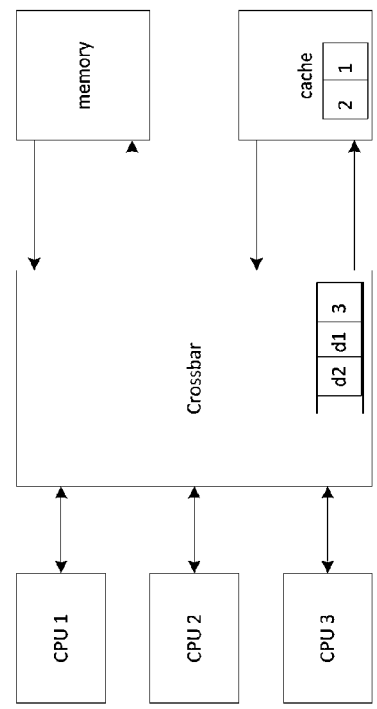
FIG. 5(a)
FIG. 5(b)
FIG. 5(c)

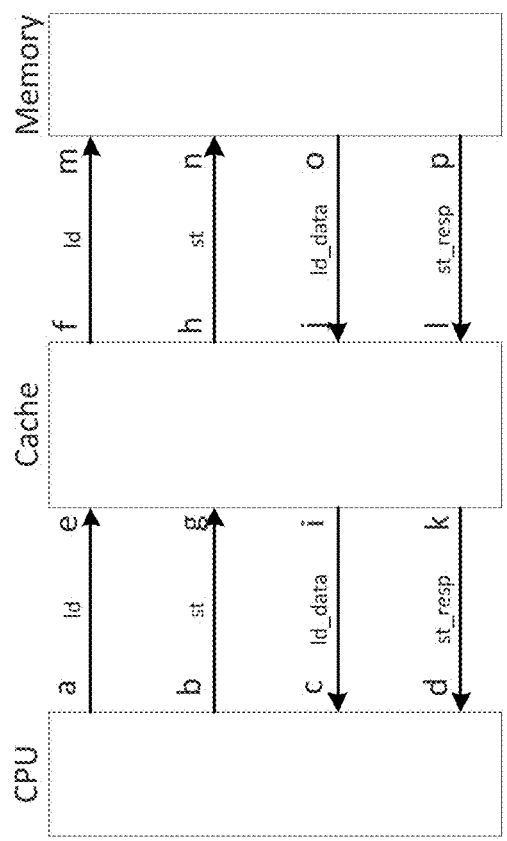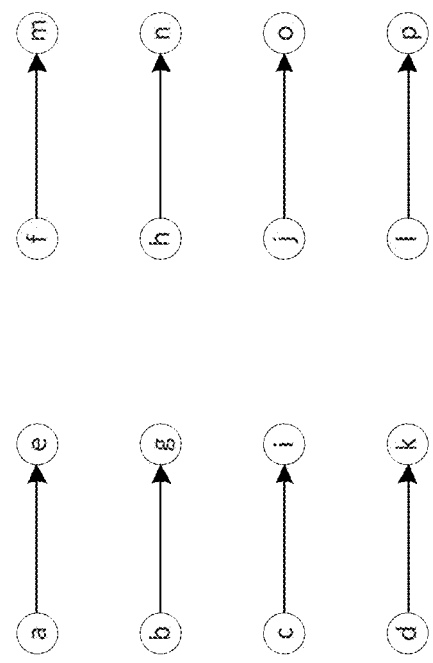
FIG. 6(a)
FIG. 6(b)

IDENTIFICATION OF INTERNAL DEPENDENCIES WITHIN SYSTEM COMPONENTS FOR EVALUATING POTENTIAL PROTOCOL LEVEL DEADLOCKS

CROSS-REFERENCE TO RELATED APPLICATION(S)

This application claims the benefit of U.S. application Ser. No. 13/942,332, filed Jul. 15, 2013, the disclosure of which is hereby incorporated by reference.

TECHNICAL FIELD

Methods and example implementations described herein are generally directed to interconnect architecture, and more specifically, to protocol level deadlock detection and avoidance in network on chip systems interconnect architecture.

RELATED ART

The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing, which may be implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinate in a particular sequence until the message reaches the final destination. For example, in a 3-D mesh network, one may first route along the X dimension until it reaches a router whose X-coordinate is equal to the X-coordinate of the destination router. Next, the message may take a turn and be routed along the Y dimension and finally take another turn and move along the Z dimension until the message reaches the final destination router. Dimension ordered routing may be minimal turn and shortest path routing.

FIG. 2 pictorially illustrates an example of XY routing in a two dimensional mesh. More specifically, FIG. 2 illustrates XY routing from node '34' to node '00'. In the example of FIG. 2, each component is connected to only one port of one router. A packet is first routed over the X-axis till the packet reaches node '04', where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. Such alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follow the head flit, containing the remaining payload of data. The final flit is the tail flit, which in addition to containing the last payload, also performs some book-keeping to close the connection for the message. In wormhole flow control, virtual channels are often implemented.

Physical channels typically are time sliced into a number of independent logical channels called virtual channels (VCs). VCs provide multiple independent paths to route packets, wherein each VC is time-multiplexed on corresponding physical channel. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels, wherein the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. Capacity of various physical channels of a NoC interconnect can be determined by the width of the channel (number of physical wires) and the clock frequency at which it is operating. Various channels of the NoC may operate at different clock frequencies, and various channels may have different widths based on the bandwidth requirement at the channel. Bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes.

In a NoC with statically allocated routes for various traffic flows, load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Deadlock occurs in a system NoC interconnect when messages are unable to make forward progress to their destination because the messages are waiting on one another to free up resources (e.g. at buffers and/or channels). Deadlocks due to blocked buffers can quickly spread over the entire network, which may paralyze further operation of the system. Deadlocks can broadly be classified into network level deadlocks and protocol level deadlocks.

Deadlock is possible within a network if there are cyclic dependencies between the channels in the network. FIG. 3 illustrates an example of network level deadlock. In the example of FIG. 3, starting at a state with all buffers empty, the blocks initiate the message transfer of A→C, B→D, C→A and D→B simultaneously. Each block takes hold of its outgoing channel and transmits the message toward its destination. In the example of FIG. 4, each channel can hold only one message at a time. From this point on, each channel waits on the next channel to move the message further. There is a cycle in the channel or message dependency graph and the network becomes deadlocked. Such network level deadlock or low-level deadlocks can be avoided by construction using deadlock free routing or virtualization of paths using multiple virtual channels and keeping them from back pressuring each other.

Network end points may not be ideal sinks, i.e. they may not consume all incoming packets until some of the currently outstanding packets are processed. If a new packet needs to be transmitted during the processing of an outstanding packet, a dependency may be created between the NoC ejection and injection channels of the host. The dependency may become cyclic based upon the message sequence, position of components and routes taken by various messages. If the deadlock is caused by dependencies external to the network layer, it is referred to as a high-level protocol or an application level deadlock. In existing systems, most high level tasks involve a message flow between multiple hosts and ports on the NoC in a specific sequence. Software applications running on large multi-core systems often generate complex inter-communication messages between the various hosts and ports. Such a multi-point sequence of intercommunication may introduce complex dependencies resulting in protocol level deadlock in the system interconnect.

An underlying cause of deadlock remains some form of channel, buffer and message dependency cycle introduced by the inter-dependent messages between one or more ports of one or more hosts. Independent messages from one end point to another on the network do not cause protocol level deadlocks; however, depending on the routing of such messages on the network, network level deadlocks are still possible in the system.

FIGS. 4(a), 4(b) and FIGS. 5(a) to 5(c) illustrate an example of protocol level deadlock. Consider an example of a three central processing unit (CPU) system connected to memory and cache controller through a crossbar. The cache controller's interface to the interconnect has a single First-In-First-Out (FIFO) buffer which can hold a maximum of three messages. Internally, the cache controller can process up to two requests simultaneously (and therefore process up to two outstanding miss requests to the memory).

At FIG. 4(a), all three CPUs send read requests to the cache controller.

At FIG. 4(b), read requests are queued in an input buffer to the cache controller from the crossbar.

At FIG. 5(a), the cache controller accepts two requests '1' and '2' from input buffer while the third request '3' remains in the input buffer. '1' and '2' have a read miss in the cache, which in turn issues miss refill requests 'm1', 'm2' to the memory At FIG. 5(b), the memory returns refill data 'd1', 'd2'. This data gets queued behind '3' in the cache controller's input buffer.

At FIG. 5(c), the cache controller waits for refill data for the outstanding requests before accepting new request '3'. However the refill data is blocked behind this request '3'. The system is therefore deadlocked.

In this system, deadlock avoidance can be achieved by provisioning additional buffer space in the system or by using multiple physical or virtual networks for different message types. In general, deadlock is avoided by manually 1) interpreting the intercommunication message sequence and dependencies, 2) then allocating sufficient buffers and virtual and/or physical channels and 3) assigning various messages in the sequence the appropriate channel.

In large scale networks such as the internet, deadlocks are of a lesser concern. Mechanisms such as congestion detection, timeouts, packet drops, acknowledgment and retransmission provide deadlock resolution. However such complex mechanisms have substantial limitations (e.g., design cost) in terms of power, area and speed to implement on interconnection networks where the primary demands are low latency and high performance. In such systems, deadlock avoidance may become an architectural requirement.

SUMMARY

The present application is directed to automatic detection of internal dependencies within and between system components/cores based on traffic messages that are transmitted and/or received by a component at its incoming and outgoing interface channels in order to evaluate potential protocol level deadlocks and design a deadlock free system using the detected dependencies. An example implementation of 1) the process of determining internal dependencies present within a system component and between system components, 2) using the determined dependencies to detect protocol level deadlocks and to construct a deadlock free system NoC interconnect is also disclosed.

Aspects of the present application may include a method, which involves, automatically determining internal dependency specification of a component and communication dependencies between components based on simulation runs conducted by varying flow of messages (system traffic) by manipulating one or more incoming and outgoing interface channels.

Aspects of the present application may include a computer readable storage medium storing instructions for executing a process. The instructions may involve, determining internal dependency specification of an Intellectual Property (IP) core and communication dependencies between cores based on simulation runs conducted by varying flow of messages through one or more incoming and outgoing interface channels.

Aspects of the present application may include a method, which involves, for a network on chip (NoC) configuration including a plurality of cores interconnected by a plurality of routers in a heterogeneous or heterogeneous mesh, ring or taurus arrangement, generating a deadlock free system using the internal dependency specification and inter-communication dependencies determined for and between system components/cores.

Aspects of the present application may include a system, which involves a component internal dependency computation module configured to determine one or more internal dependencies within and between system components by varying message flow controls in incoming and outgoing interface channels of one or more system components.

BRIEF DESCRIPTION OF THE DRAWINGS

FIGS. 5(a) to 5(c) illustrate message exchange in the memory subsystem causing protocol level deadlock.

FIG. 6(a) illustrates message exchanges between CPU, cache and memory based on the system traffic profile, and FIG. 6(b) illustrates the resulting dependency graph.

DETAILED DESCRIPTION

Figure 1A:
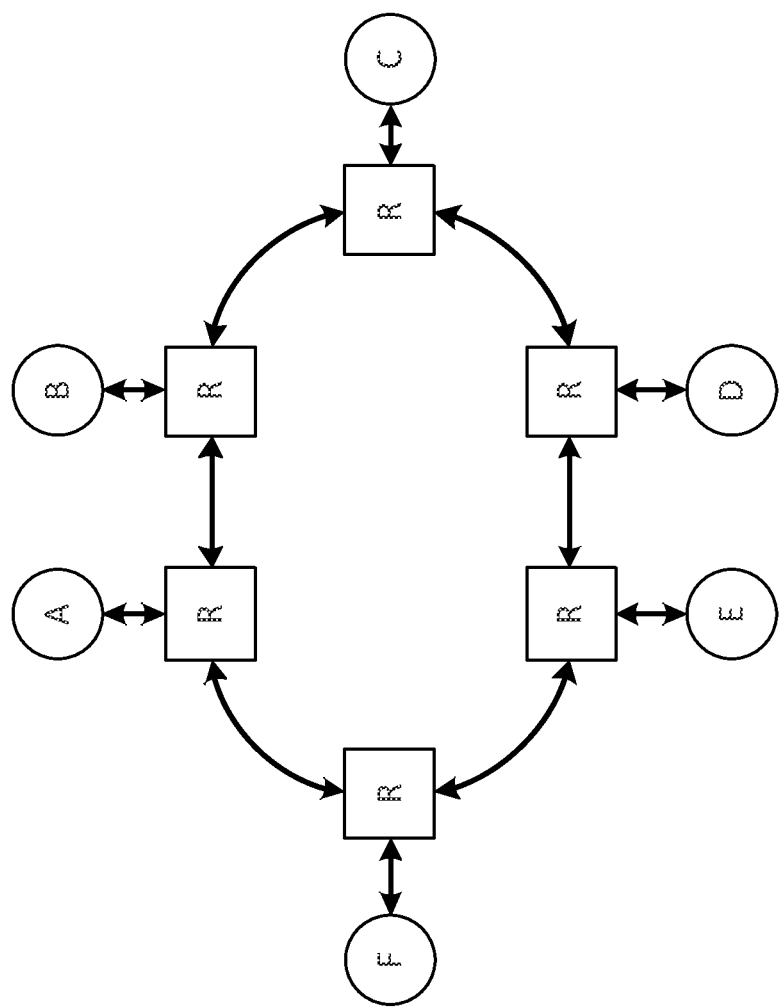
FIGS. 1(a), 1(b) 1(c) and 1(d) illustrate examples of Bidirectional ring, 2D Mesh, 2D Torus, and 3D Mesh NoC Topologies.
Figure 1B:
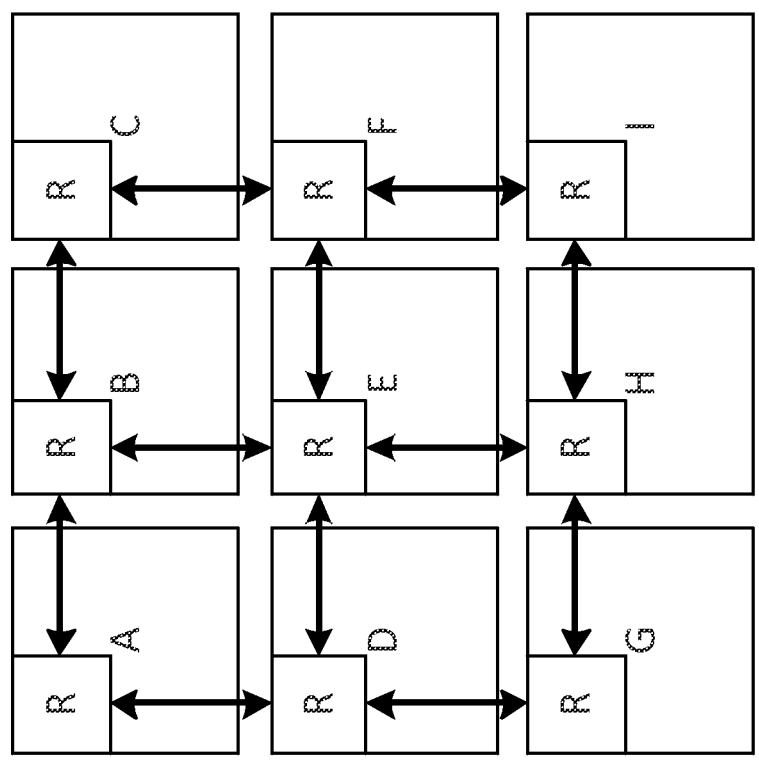
Figure 1C:
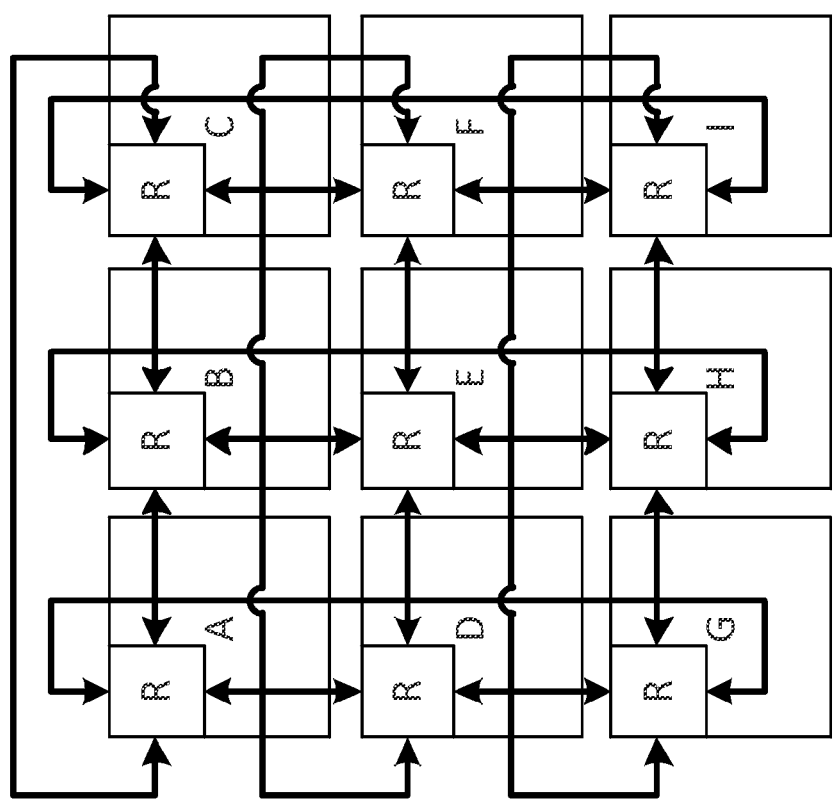
Figure 1D:
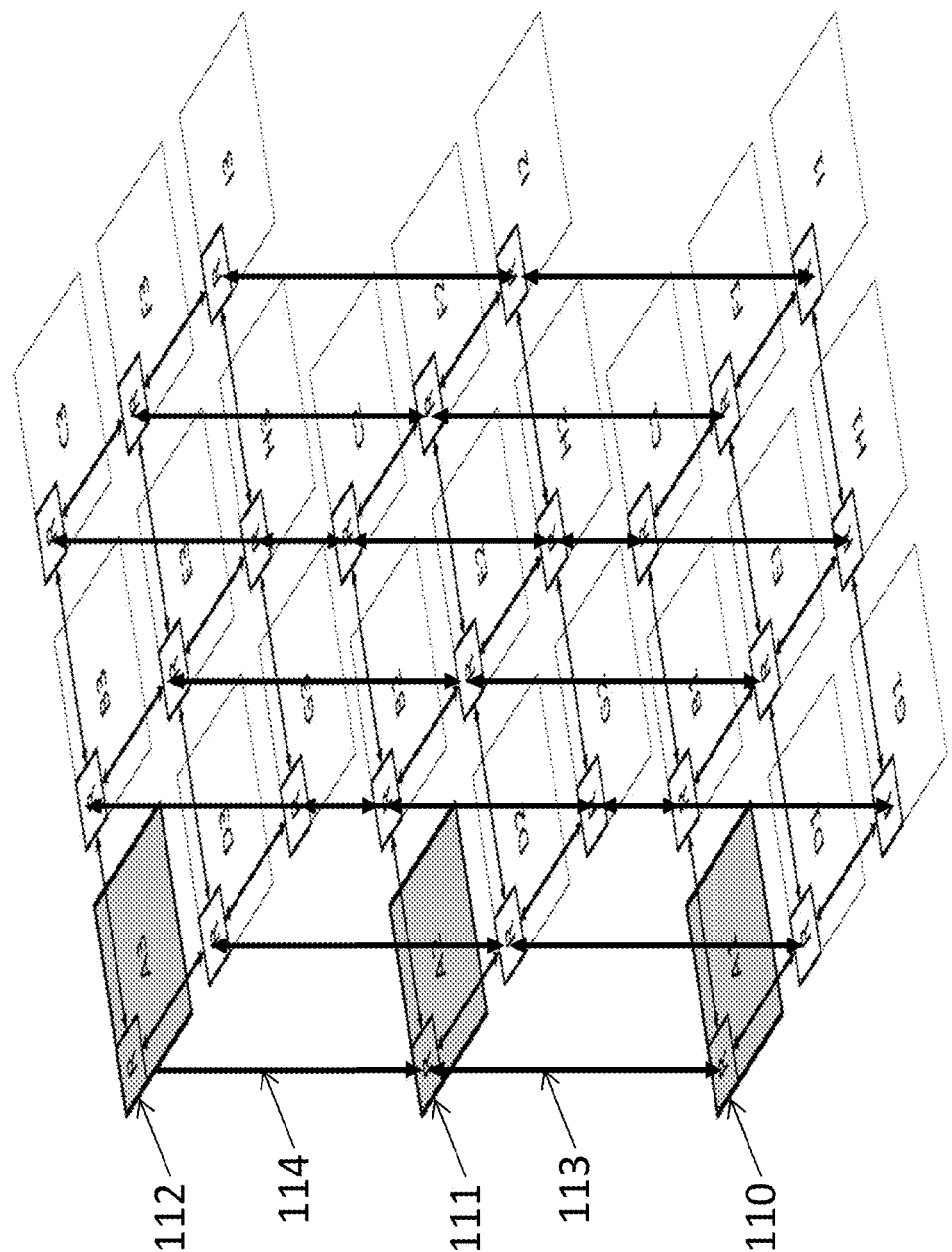
Figure 2:
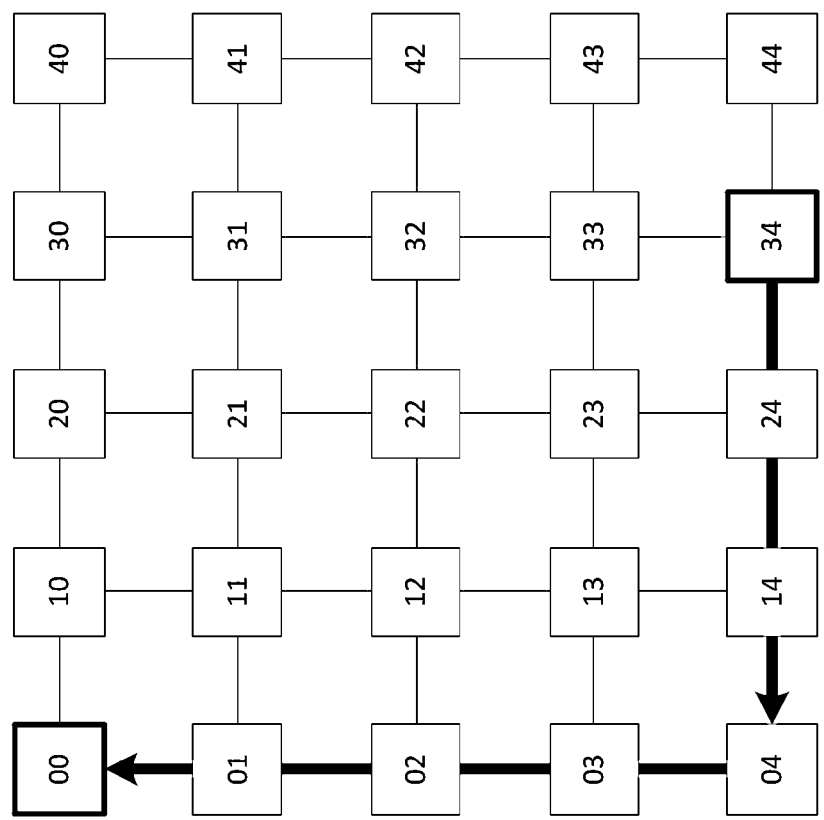
FIG. 2 illustrates an example of XY routing in a related art two dimensional mesh.
Figure 3:
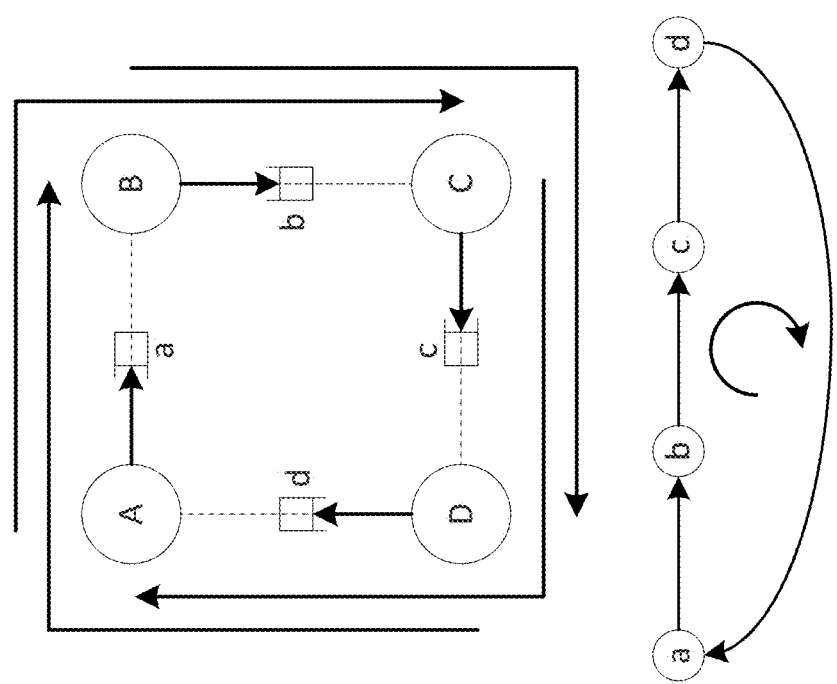
FIG. 3 illustrates an example of network level deadlock.
Figure 4A:
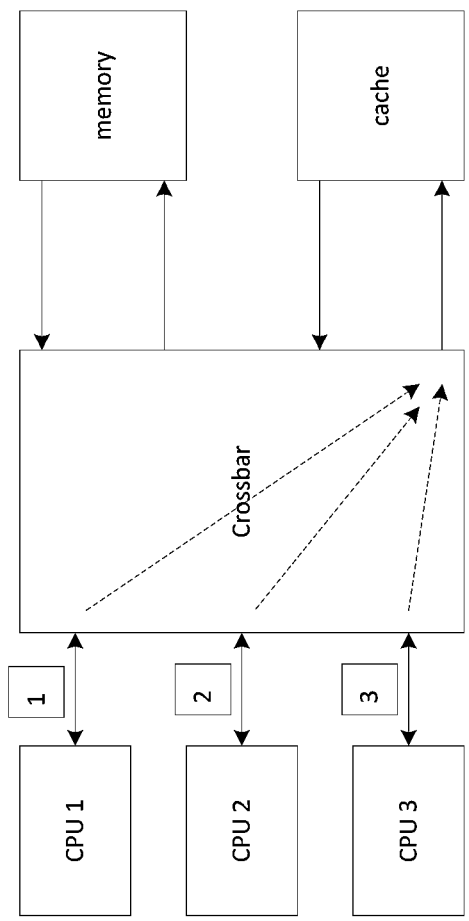
FIGS. 4(a) and 4(b) illustrate an example memory subsystem with three CPUs issuing read requests to cache controller.
Figure 4B:
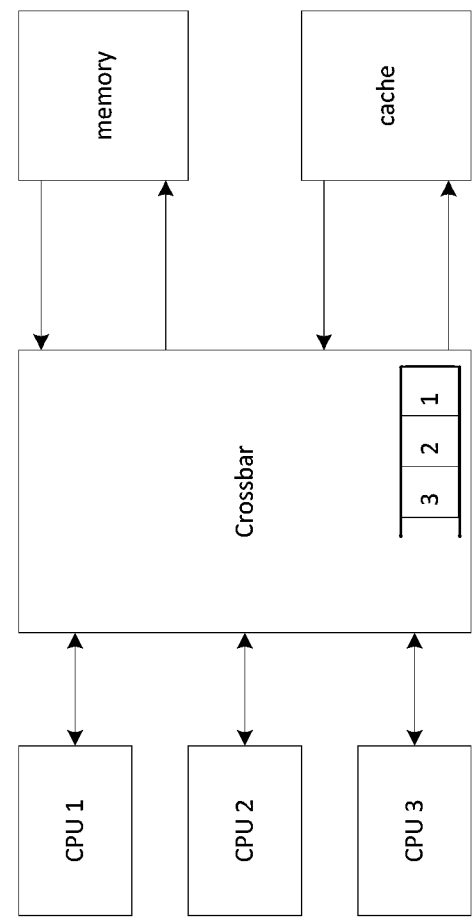

The following detailed description provides further details of the figures and exemplary implementations of the present application. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present application.

Applications running on large multi-core systems can result in a variety of messages flowing between various transmit and receive channels of various cores. When a message arrives at the receive channel, also referred to as incoming interface channel hereinafter, of a core, the message is accepted for processing. Often during the processing, the core may wait for additional messages to arrive at certain receive channels of the core or may need to send new messages at certain transmit channels, also referred to as outgoing interface channels hereinafter, of the core and subsequently may wait for their responses to arrive. The processing resources allocated for the message cannot be freed up until all dependent transactions for the message are completed, therefore a dependency is created between the message being processed and the messages that are either expected to be transmitted or received.

There may be cases when certain messages need to be transmitted or received by other cores before this core can complete processing the message, thereby creating more complex dependencies between multiple cores. Different cores/components in a system may have different behavior in the way they process the arriving messages, and the processing may depend on other messages being received or transmitted at this core or at other cores in the system. In a more complex application running on a variety of different cores, many complex dependencies may exist, leading a deadlock to occur if a cyclic dependency is formed.

The present application is directed to using a specification to characterize behavior of cores used in the system and to automatically analyze and avoid protocol level deadlocks. The specification attempts to capture the internal dependencies present within the core/component between various messages being transmitted and received by the core and the other cores. Exemplary implementations described herein are based on the concept of determining various internal dependencies for a core by simulating change in message flow patterns by manipulating one or more incoming and outgoing interface channels and measuring the dependency impact of the change on other channels of the core in order to automatically detect protocol level deadlocks in the system and construct deadlock free 2-D, 2.5-D and 3-D NoC interconnects. System traffic contains a list of all messages exchanged between transmit and receive channels of various cores. Examples of such internal dependency specification determination, automatic protocol level deadlock identification, and a process of automatically constructing deadlock free interconnect are also disclosed.

The example system illustrated in FIG. 6(a) shows various internal dependencies by using incoming (input/receive) and outgoing (output/transmit) interface channels that may be present in a core. CPU uses transmit channels a and b to send ld and st messages on receive channels e and g respectively of cache. Cache may have a miss and a dirty line may have to be written back, in which case cache will use transmit channels f and h to send ld and st messages to the receive channels m and n of the memory. Memory then uses transmit channels o and p to send ld_data and st_resp messages, which are received by cache on channels j and l. Cache then sends the ld_data and st_resp messages at transmit channels i and k to the receive channels c and d of the CPU. If cache has a hit, then the cache directly sends the ld_data and st_resp messages to the CPU. In this example system, the system traffic profile includes a list of messages and their source and destination cores and channels such as the one shown below.

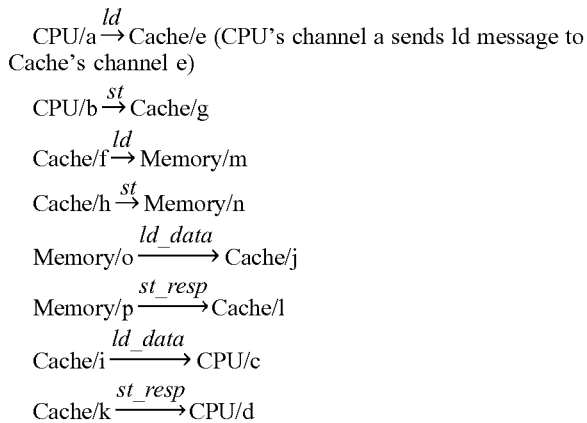

Figure 7A:
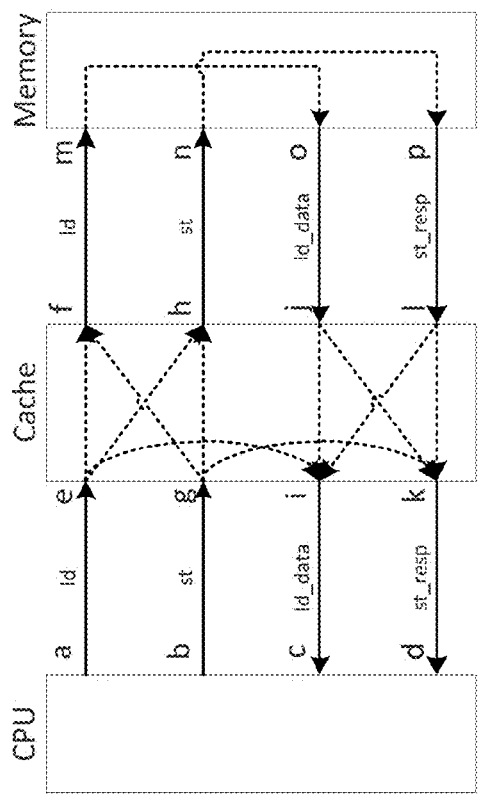
FIG. 7(a) illustrates message exchanges and resulting internal dependencies within the cores based on core's internal dependency specification.
Figure 7B:
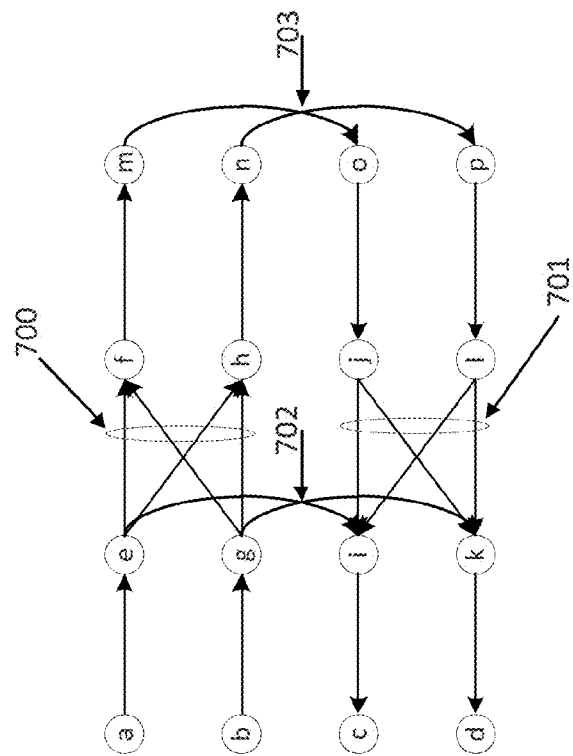
FIG. 7(b) illustrates the resulting dependency graph.

Since only one type of message is present at a channel in this example, this message exchange creates respective dependencies between various channels of the cores, which is shown in FIG. 6(b). In this dependency graph, only the pairwise inter-core channel dependencies are present due to the system traffic; internal dependencies present in various cores are not present. To capture the entire system dependency, a specification for the internal dependencies present in CPU, cache and memory cores are designed. CPU issues ld and st messages and waits for ld_data and st_resp respectively. If ld and st are issued without having to depend on any other transaction and ld_data and st_resp are always accepted and consumed upon arrival at the CPU, then there is no internal dependencies in the CPU. In cache, arriving ld and st messages may result in a cache miss, which may generate a refill ld message and wait for the refill response, the ld_data message. If a dirty line needs to be replaced then an additional writeback, st message, may be generated and wait for the st_resp message. These internal dependencies are listed below.

ld message on channel e may produce ld message on channel f ld message on channel e may produce st message on channel h st message on channel g may produce ld message on channel f st message on channel g may produce st message on channel h Since there is a one to one correspondence between messages and channels, the message dependencies will result in channel dependency between channels e and g over which ld and st messages arrive, and channels f and h over which refill and writeback messages are sent. These dependencies are shown as the arrows 700 in FIG. 7(b). After these messages are sent, and once the ld_data and st_resp response messages arrive from the memory, cache can continue processing the original ld or st message. In some cache designs, the ld_data and st_resp may be guaranteed to be accepted upon arrival, in which case there will not be any dependency for these messages, else following additional dependencies may be present at cache.

ld_data message on channel j may produce ld_data message on channel i st_resp message on channel l may produce ld_data message on channel i ld_data message on channel j may produce st_resp message on channel k st_resp message on channel l may produce st_resp message on channel k These dependencies are shown as the arrows 701 in FIG. 7(b). When all required messages are generated and responses are received, cache will send response messages (ld_data or st_resp) to the CPU and complete the processing of the ld or st message. This represents an additional dependency between channels e and i at which ld and st messages arrive and channels g and k at which responses are sent, respectively. This is shown using arrows 702 in FIG. 7(b).

In the memory, a ld message received produces a ld_data message while a st message produces a st_resp message. These dependencies are listed below and shown as arrows 703 in FIG. 7(b).

ld message on channel m produces ld_data message on channel o st message on channel n produces st_resp message on channel p With the specification of internal dependencies between various messages and their corresponding channels of CPU, cache, and memory, a full dependency graph of the system can be constructed automatically as shown in FIG. 7(b). This dependency graph now contains both the inter-core dependencies based on the system traffic profile and the internal dependencies present in all cores. If a cycle is present in the graph then there may exist protocol level deadlock in the system.

There may exist additional dependencies within a core that are not obvious. For example, if the internal data path of memory is designed such that ld and st messages are processed by a common buffer and logic then all dependencies on channel m created by the ld message will also apply on channel n where st message is received and vice-versa. One may design the internal data path of memory such that certain types of messages may bypass others but not vice-versa. For example, an arriving ld or st message must wait for st messages that are currently being processed in the core, but an arriving st message may bypass all ld messages that are currently being processed. In this case all dependencies of st message on channel n will apply to the channel m where ld messages are received but not vice-versa. Thus, there is a need to manage the internal design of a core and specify correct dependencies as part of the core's internal dependency specification.

Figure 8A:
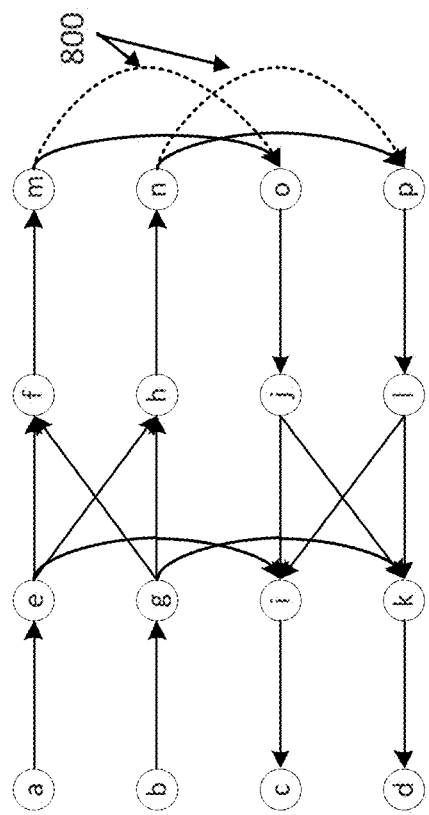
FIGS. 8(a) and 8(b) illustrate the dependency graphs if the internal dependency specifications of various cores are different.

Assuming that ld and st messages share a common data path in memory and there is no bypass policy (i.e. ld and st are processed in-order and ld does not bypass st and vice-versa), dependencies of ld and st messages will apply on each other. The resulting dependency graph is shown in FIG. 8(a); the new dependencies are shown as dotted arrows 800. In spite of the new dependencies, there are no cycles in the graph and therefore no protocol level deadlock is present.

One may use an alternative cache design such that a st message for writeback is not send on channel h immediately upon a miss, but only after arrival of the refill data (ld_data) message. Arriving ld_data message displaces the dirty cache line which will now be written back by sending a st message on channel h. The dependency specification in this cache will include the following additional entry.

ld_data message on channel j may produce st message on channel h

Figure 8B:
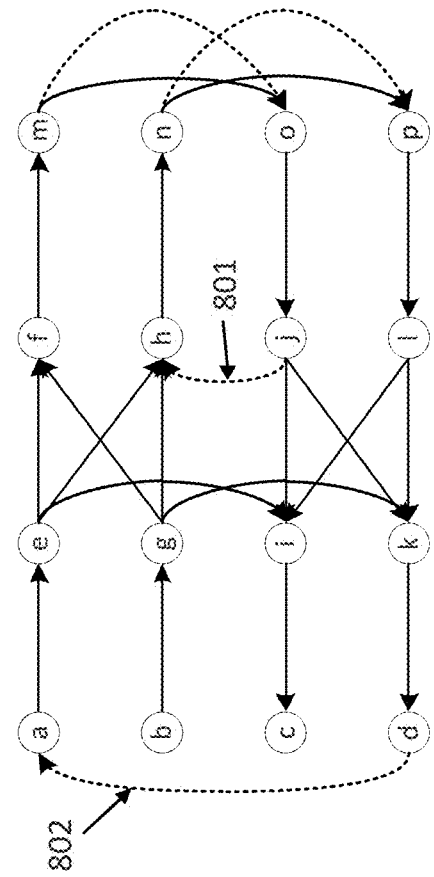

The dependency graph will include a new edge which is shown in FIG. 8(b) as the dotted arrow 801. There is a cycle in this graph and the resulting system therefore may have a protocol deadlock. As another example, one may use an alternative design for the CPU, in which an arriving st_resp on channel d may need to produce a ld message on channel a. The resulting edge in the dependency graph is shown as the dotted arrow 802 in FIG. 8(b). This edge adds more cycles in the dependency graph creating new deadlock scenarios. Such deadlocks are application or protocol level deadlocks, which can be avoided either by changing the system traffic profile or by altering the internal design of cores so that there is no cyclic dependency in the system.

It is therefore important to accurately understand and determine the internal dependencies between various messages that are transmitted and received by a component/core at its various interface channels in order to design a protocol-level deadlock free system using one or more system components. Furthermore, accurate knowledge of internal dependency within and between various system components is critical to design an interconnect that is deadlock free at network level. Unfortunately, it is a non-trivial task to correctly describe all internal dependencies within system components as they depend upon the micro-architecture, circuit design, among other attributes of the component. It is specially challenging when system components are designed by teams other than ones who integrate them, or when off-the-shelf IPs are used whose internal design details are not accessible. In these circumstances, it is possible to miss a few internal dependency descriptions of certain system components when designing the interconnection network for the system, which may result in protocol level deadlock in the system and/or network level deadlock in the interconnect. The instantly proposed invention describes solutions that address the problem of detecting protocol level deadlocks by efficiently identifying internal dependencies within a system component or a group thereof and evaluating whether such dependencies form a cycle. In an embodiment, systems and methods of the present invention automatically determine internal dependencies between various messages transmitted and received by a system component at its various interface channels and automatically detect missing internal dependencies in an integrated system so that they can be corrected.

Figure 9:
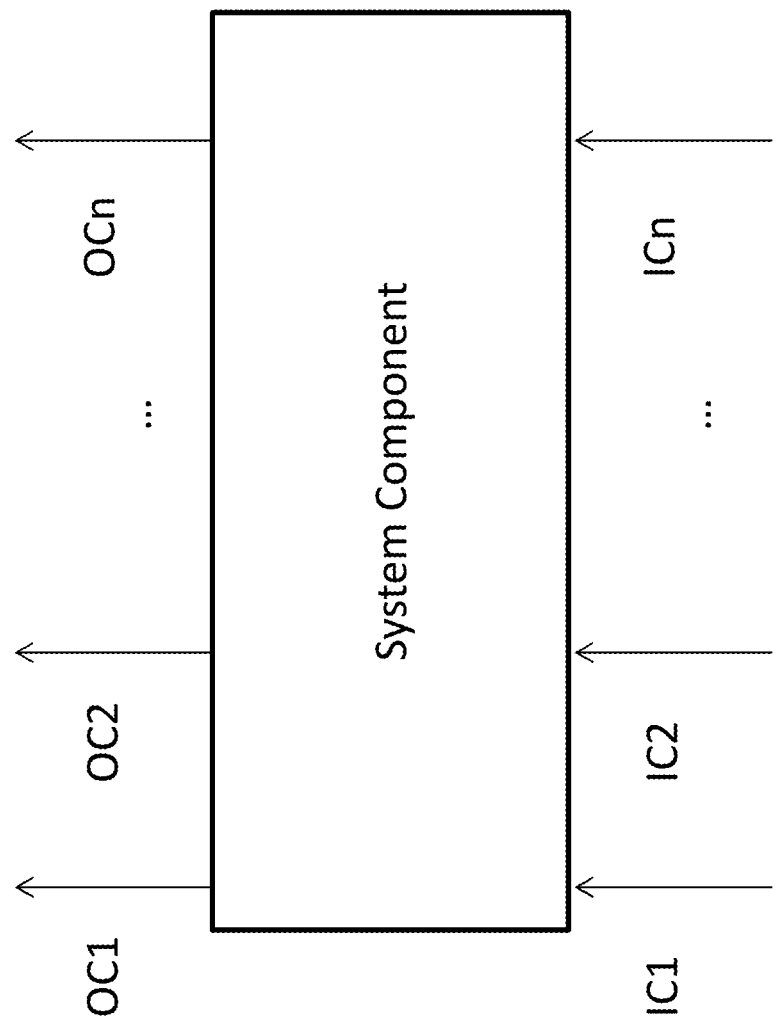
FIG. 9 illustrates a system component having multiple incoming interface channels and outgoing interface channels.

In one exemplary implementation, systems and methods of the present invention use simulation to automatically determine internal dependency specification of a system component/core. FIG. 9 illustrates a system component with multiple incoming and outgoing interface channels, denoted by "IC" and "OC" respectively. Various input messages arrive at the incoming interface channels such as IC1, IC2, . . . ICn and output messages depart at the outgoing interface channels such as OC1, OC2, . . . OCn. There may also exist some dependency description available for this component in the form of input interface channel to output interface channel dependency. A dependency a=>b means that input interface channel "a" depends on output interface channel "b", or in the event of backpressure at interface channel "b", interface channel "a" will also begin to experience backpressure. In an implementation, in order to determine missing dependency in an IP core design, circuit, RTL, functional, or model-based simulations of components may be performed, wherein the input traffic is generated and output traffic is received. A comprehensive simulation set can cover most scenarios and internal data paths, wherein, during each simulation, an output interface channel of a component can be blocked due to which output messages or transactions at this output interface channel are not accepted anymore. As a result of this interface channel configuration, if an internal dependency exists for the output interface channels in the component, corresponding input interface channels IC will begin to experience backpressure and may stop transmitting or get blocked. For all input interface channels that are blocked, an internal dependency from these to the output interface channel exists.

With respect to FIG. 9, assuming output interface channel OC2 is blocked during the first simulation run, in case there exists dependency of one or more incoming interface channels on the output channel OC2, the corresponding channels, say IC3 and IC4, will begin to experience backpressure and may stop transmitting or get blocked. Such backpressure or any other measurable and defined impact on the incoming interface channel(s) can create a dependency, which can accordingly be incorporated in the dependency graph. This procedure may be repeated for each output interface channel of the component to determine the input interface channels dependency on all output interface channels.

Another implementation of the proposed system and method of the present invention includes using a certain permutation of output interface channels OC that are blocked simultaneously instead of only a single output interface channel at a time. Such manipulation of two or more channels at the same time can be helpful in determining existence of dynamic dependencies. For example, if in a component, an input interface channel message departs at either of two output interface channels, a dependency exists in the system between the input interface channel to the two output interface channels. Blocking a single output channel at a time in such a case would not find any dependency. This dependency would be found only when both output interface channels OCs are blocked simultaneously and blocking at the input interface channels ICs is observed. When number of interface channels in a component is small, all n! permutations of output interface channels may be blocked and dependencies may be determined for each case. Later the collected information can be processed and pruned to determine the actual dependencies.

Pruning of information is important to avoid the identification of many false dependencies. For instance, in case all permutations n! are tried, one permutation would include all output interface channels, wherein if all the output interface channels OCs are blocked, all the input interface channels may be blocked too. Therefore without pruning, we will infer a full dependency between every input and every output interface channel, which might not actually be the case. As a result, it is required to identify the smallest subset of output interface channels that is causing backpressure on an input interface channel for determining its dependency. A number of alternative algorithms may also be used for pruning.

Figure 10:
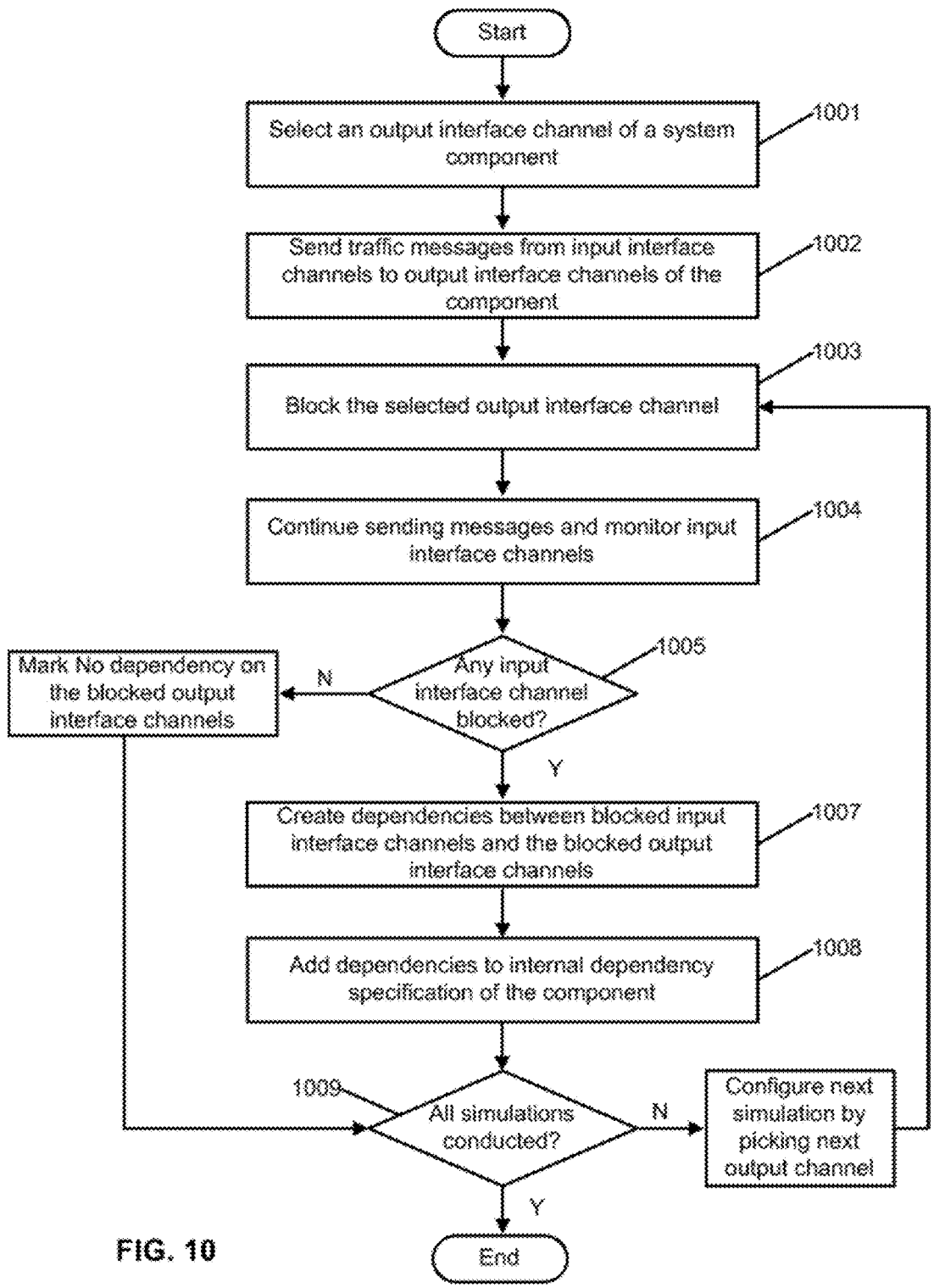
FIG. 10 illustrates a flowchart showing determination of internal dependency specification of a system component based on varying traffic message flow by changing configuration of one outgoing interface channel at a time.

FIG. 10 illustrates a flowchart 1000 for determining internal dependency in a system component by manipulating control of message flow from incoming and outgoing interface channels. In the implementation as depicted in FIG. 10, at 1001, the system, in a given simulation run, picks an output interface channel, say OCa, from amongst the output interface channels OCa-z. At 1002, the system starts sending system traffic by means of messages through incoming interface channels and receiving resulting outputs so as to allow normal flow control. At 1003, the picked output channel OCa is blocked or configured such that no messages at channel OCa are accepted. Such configuration can be done by changing system component's traffic flow characteristics and enabling no messages to be received at the selected output channel. At 1004, simulation is continued by sending traffic messages from the input interface channels for a long but finite time and behavior of input interface channels is observed. The time for which each simulation runs and behavior of input interface channels is assessed can be automatically configured based on the output channel in context, type of traffic, priority of messages, or any other parameter. Behavior of input interface channels can include blocking of the channel by virtue of not being able to send messages due to backpressure being created by blocking of the output channel OCa. At block 1005, it is determined as to whether any input interface channel is blocked. At 1006, if none of the input interface channels are blocked, no dependency is marked for the blocked output interface channel and next sequenced simulation for the next output interface channel is initiated. At 1007, it may be concluded that for all blocked input channels or for input channels that have a different/abnormal behavior, there exists a dependency between the blocked input interface channels and the selected output interface channel OCa. Each such dependency is accordingly created. At 1008, each created dependency of the blocked input interface channels on the selected output interface channel in context is added to the dependency description of the component if the same is not already present. At 1009, it is checked for whether all simulations have been conducted, wherein if all the simulations on all the output interface channels are over, the method ends and dependency graph can be analysis to determine the internal dependency specification of the component. At 1010, if all the simulations are not over, the next output interface channel is picked and the method proceeds back to step 1003.

Figure 11:
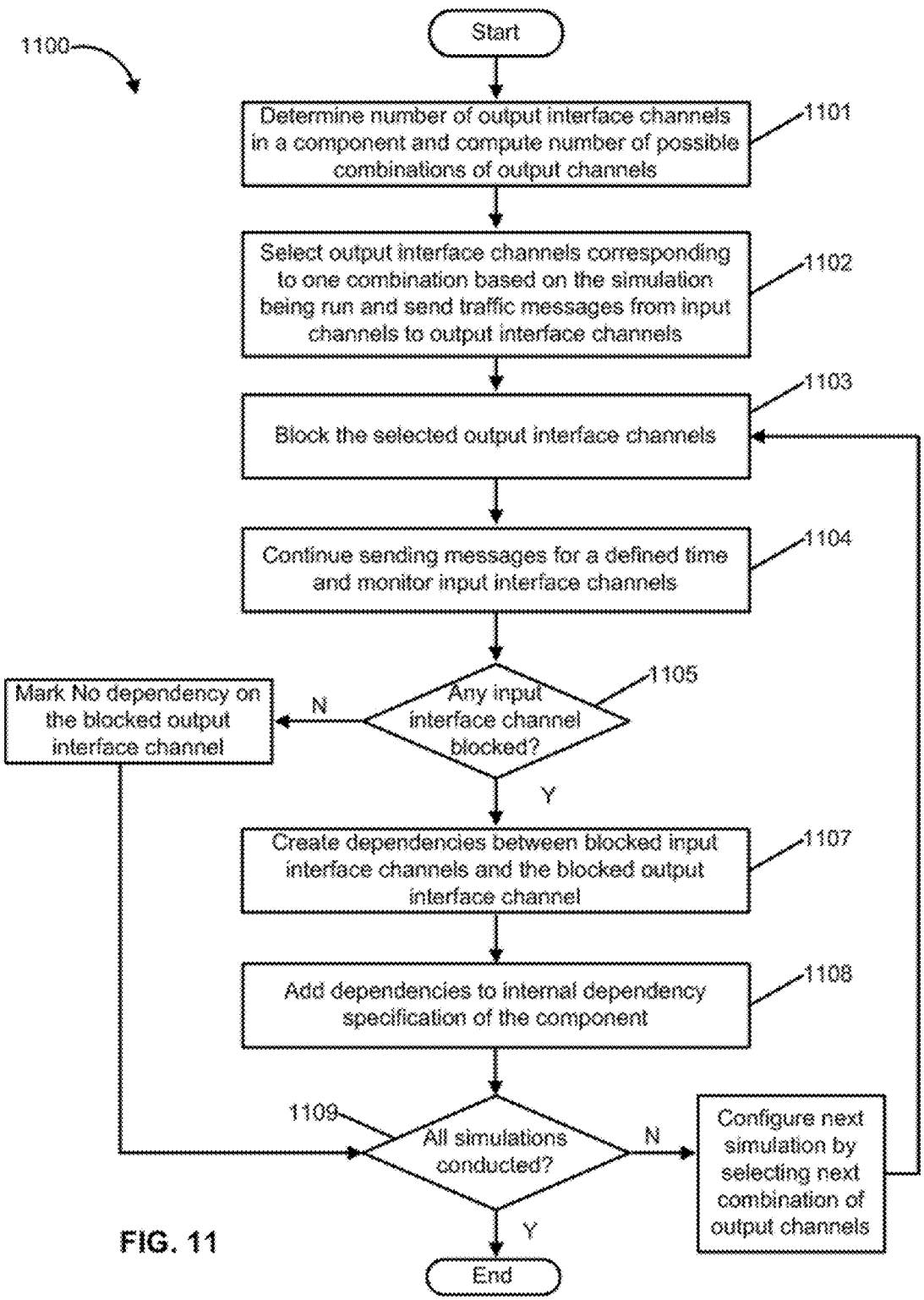
FIG. 11 illustrates a flowchart showing determination of internal dependency specification of a system component based on varying traffic message flow by changing configuration of multiple outgoing interface channels at a time.

FIG. 11 illustrates a flowchart 1100 for determining internal dependency in a system component by manipulating control of message flow from incoming and outgoing interface channels. In the implementation as depicted in FIG. 11, at 1101, the system determines the number of output interface channels for a given component (depicted as n) and computes n! permutations of the output channels. For instance, for a component having 3 output channels, the total possible combinations of the channels would be 6, one of which would include a situation in which none of the channels are selected and one in which all the three channels are selected. At 1102, for a given permutation, say 2 output channels being selected, simulation on the component is conducted by sending correct messages from the incoming interface channels and receiving the results at the output channels. At 1103, the selected output channels (2 in the above instance) are blocked or configured such that no messages at the channels are accepted. Such configuration can be done by changing system component's traffic flow characteristics and enabling no messages to be received at the selected output channel. At 1104, simulation is continued for a long but finite time by transmittal of traffic messages from input channels to output channels and behavior of input interface channels is observed. The time for which each simulation runs and behavior of input interface channels is assessed can be automatically configured based on the output channels in context, type of traffic, priority of messages, or any other parameter. Behavior of input interface channels can include blocking of the channels by virtue of not being able to send messages due to backpressure being created by blocking of the output channels. At block 1105, it is determined as to whether any input interface channel is blocked. At 1106, if none of the input interface channels are blocked, it is marked that no dependencies exist on the selected output interface channels and next sequenced simulation for the next combination of output interface channels is initiated. At 1107, it is confirmed that for all blocked input channels or for all input channels that have a different/abnormal behavior above a defined threshold, there is a dependency between the blocked input interface channels and the output interface channels that were selected for the simulation run. At 1108, each dependency of the blocked input interface channels on the selected output interface channels is added to the dependency description/specification of the component if the same is not already present. At 1109, it is checked for whether all simulations have been conducted, wherein if all the simulations on all the combinations of output interface channels are over, the method ends and dependency graph can be analysis to determine the internal dependency specification of the system component. At 1110, if all the simulations are not over, the next combination of output interface channels is picked and the method proceeds back to step 1103.

It should be appreciated that the above mentioned methods illustrated in FIG. 10 and FIG. 11 are merely for exemplary purposes and any suitable change in the flow can be done to improve the efficiency of the method. For instance, the step of blocking one or more output interface channels (step 1103) can be performed before the simulation is actually started i.e. before the traffic messages from incoming channels are sent to the outgoing channels (step 1102). Similarly, additional steps such as of pruning (explained above) can also be conducted after each simulation run or after the complete simulation exercise is conducted so as to avoid redundancy and incorrect dependencies to be created by simulations run on certain permutations.

Figure 12:
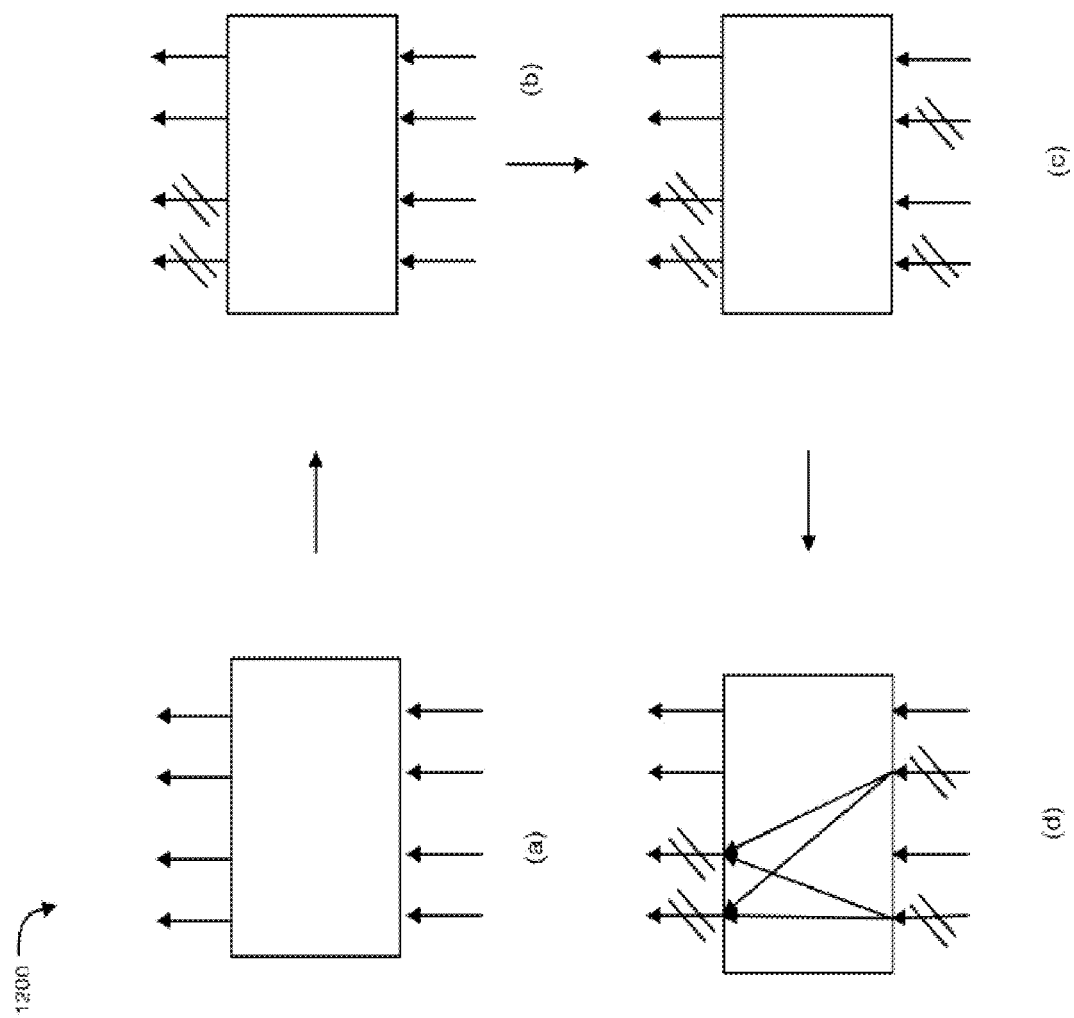
FIG. 12 illustrates change in configuration of incoming and outgoing interface channels of a system component to detect internal dependency specification of the component.

FIG. 12 illustrates a change in configuration of incoming and outgoing interface channels of a system component to detect internal dependency specification of the component. FIG. 12(*a*) illustrates a system component with four incoming channels and four outgoing channels. FIG. 12(*b*), in accordance with one simulation run, blocks the first two outgoing interface channels of the component and continues sending traffic messages to monitor the impact of blocked outgoing channels on one or more incoming interface channels. At FIG. 12(*c*), it is evaluated that due to the blocking of the two outgoing interface channels, the first and third incoming interface channels have been blocked showing dependency of the blocked incoming interface channels on the two blocked outgoing interface channels. FIG. 12(*d*) represents the dependency of the 1'st and 3'rd incoming channel on the two outgoing (1'st and 2'nd) interface channels. Such dependencies can be created by running multiple simulations on different permutations of output interface channels in order to detect the presence of a protocol level deadlock.

Another implementation of the present invention uses analysis of the component design to automatically determine internal dependency specification of the component. Internal interface channel dependencies of a component can be identified by static analysis of one or more of RTL, circuit, or functional models of the component. In an embodiment, internal dependency specification of a component can be determined by identifying and assessing logical dependencies for flow control signal of each input interface channel, wherein the flow control signal indicates whether an input data is accepted or not by the component. In an instance, logical dependencies can be computed based on parameters such as what values of other interfaces, channels, or signals can possibly affect the flow control.

According to one embodiment, flow control signal can be written as a logical function of internal state and external stimulus. Any internal state can be written as a logical function of internal state and external stimulus. While computing these exact functions may be complex, computing the set of inputs to one of these functions is much easier. For instance, if there exists a sequence of pieces of internal state that form an input-output path between an output interface channel's flow control signal and the flow control signal of an input interface channel, even if that path goes through many types of internal states (buffers, queues, etc.), it may be possible for that output interface channel to block the input interface channel being examined.

Above mentioned analysis to understand logical dependencies for flow control signal may be conservative, meaning that some dependencies will be detected even if there is no real dependency in the component/core, which may lead to sub-optimal interconnect design or may raise false alarm of protocol level deadlock detection. In an implementation, identified dependencies can therefore manually be analyzed and addressed to ensure removal of false positives to the extent possible. At the same time, it would be appreciated that false negatives in the dependency description are unacceptable as these may actually cause protocol deadlocks, while false positives are often encouraged to be on the conservative side and avoid deadlocks.

In another implementation, deadlock encountered during system simulation can be analyzed by taking into consideration two or more components that form part of the proposed system, and determine whether the root cause of a deadlock is a missing dependency in a system component's internal dependency specification. As system components are logically interconnected with each other, it is important to isolate deadlock bugs detected in a system and address them to point to the component or group of components that are responsible for the potential deadlock to be formed. As deadlocks may exist at both protocol and network levels, protocol deadlocks arise due to internal dependencies between various receiving and transmitting interface channels of system components and due to the dependency between interface channels of different components based on the inter-communication between their interface channels. For instance, input interface channel of a component C1 can be dependent on the output interface channel of the component C4, which in turn might be dependent on its own input interface channel. Therefore, even though FIG. 10 and FIG. 11 analyze and detect dependency specification within a component, dependencies between components of a system are also extremely important to determine and evaluate to design a deadlock free architecture. If a cycle exists in the full channel dependency graph then there is a protocol level deadlock, whereas if there is no protocol level deadlock, then a system interconnect may be designed for various inter-component's communication that is deadlock free. An extended dependency graph can be drawn consisting of additional nodes and edges that represent the channels of the interconnect and dependencies between them. If there are no cycles in the graph then there is no deadlock, else there is a network level deadlock.

In an exemplary implementation, inter-component interface channel dependencies may be described in a system design. However, the internal dependencies within system components may be subtle depending on the component's internal design, and therefore even if one of these internal dependencies are missed during the system interconnect design, the system may contain deadlocks that may occur during system simulation. Deadlock during simulation will block certain interconnect channels and component interface channels from sending or receiving messages, where, from the first look, it may appear that there is a network level deadlock in the system interconnect and debugging such cases can be extremely tedious. In an implementation of the present invention, when a deadlock occurs, all input interface channels of all system components can be examined as to whether they are blocked, i.e. they are flow controlled and data is not moving through them. For each input interface channel of a component that is blocked, its internal dependency specification can be referred to, wherein if there is no dependency from this input interface channel to any other interface channel then there is a missing dependency from the blocked interface channel in this component. If there are dependencies from this input interface channel to some interface channels, then such interface channels can be examined to determine if they are also blocked. If none of them are blocked then also there is a missing dependency specification from the blocked interface channel of this component. However, if one of such interface channels is blocked and forms a cycle, a potential protocol level deadlock is detected and handled accordingly through dependency graphs. If, on the other hand, the respective interface channel is blocked but does not form a cycle, further dependencies of the interface channel can be evaluated to check if a cycle is being formed. If no such cycle is formed and all blocked input interface channels have been evaluated, it can be concluded that no protocol level deadlock would occur in the system.

This method of identifying missing internal interface dependency of system components works even if there are multiple missing internal dependencies within the same component or across inter-components. For instance, consider a system in which there are a few missing internal interface channel dependencies in one or multiple components. In such a system, if there is a cycle in the protocol dependency graph of the system based on the internal dependency specification and inter-component communication specification, then there is a protocol level deadlock and we cannot design a deadlock free interconnect for this system. Assuming that there are no cycles in the graph, an interconnection network can be appropriately designed so as to avoid any network level deadlock. In an instance, in the original acyclic dependency graph, new nodes and edges can be added to represent the interconnect channels and dependency between them. This network is deadlock free and therefore there is no cycle in the resulting expanded dependency graph. In this directed acyclic graph (DAG), nodes can be enumerated in an increasing order starting from the tail towards the head in a way that all graph edges always go from a lower node number to a higher node number. Assuming that there are a few missing dependencies; and adding these edges to the dependency graph forms a cycle. Clearly these edges must start from a higher number node and go to a lower number node (else a cycle cannot form). From among all these edges, if we select the one which starts from the highest node number (say node k), then there are no nodes above this node from where there is a missing dependency edge. Thus, there can never be a cycle in the dependency graph consisting nodes with number larger than k and therefore channels represented by these nodes can never block during a deadlock. This means that no interface channels higher than the one represented by node k can be blocked. Since all internal dependency edges must lead to higher node numbers, this means that no dependency channels of node k can be blocked. Thus, if the interface channel represented by node k gets blocked, then none of its dependency interface channels based on the specified dependency can be blocked, and our algorithm will be able to determine that there is a missing dependency from node k.

Figure 13:
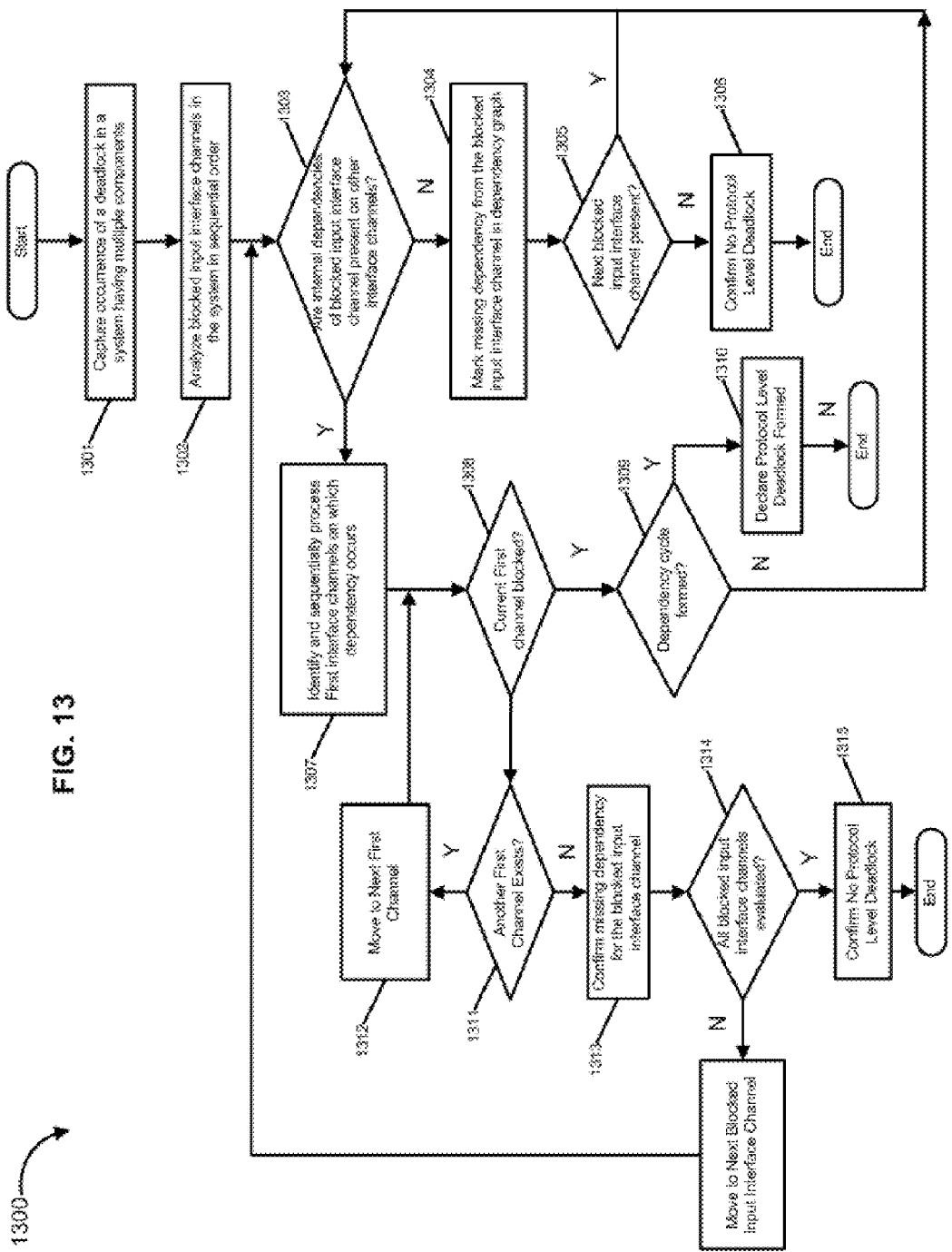
FIG. 13 illustrates a flowchart showing determination of inter-component communication dependencies between two or more system components by evaluating blocked incoming interface channels when a deadlock occurs to determine whether the deadlock is a protocol level deadlock.

FIG. 13 illustrates a flowchart 1300 for determining inter-component communication dependency specification between components of a system. In the implementation as depicted in FIG. 13, at 1301, the system observes a deadlock to have taken place. At 1302, during the deadline condition, one or more blocked input interface channels of one or more system components are analyzed. At 1303, for each blocked input interface channel, it is determined as to whether there is any internal dependency of the blocked channel on one or more channels in the specification. At 1304, if there is no internal dependency from the blocked channel to any other channel of any other system component, it is determined that there is a missing dependency from the blocked channel. At 1305, it is checked if the next blocked input interface channel exists, wherein if no blocked input interface channel exists, the method is taken to 1306 and the ends. On the other hand, if another blocked input interface channel exists, the method is taken to step 1303. At 1307, if there is some dependency from the blocked channel to one or more first channels, these one or more "First" channels are examined and sequentially processed for evaluation of further dependencies. At 1308, for each First channel being examined, it is assessed as to whether the first channel is blocked. At 1309, if the first channel in context is found to be blocked, it is evaluated if a dependency cycle is formed. At 1310, if a cycle is formed, a protocol level deadlock is confirmed to have occurred and is accordingly declared. On the other hand, if no cycle is formed, the blocked first channel is sent to step 1303 to check for its internal dependency. At 1311, it is checked as to whether another First channel exists, wherein First channels are channels on which the blocked input interface channel in context is dependent. At 1312, if it is determined that another First channel exists, the first channel iteration is incremented and the method flows back to step 1308. At 1313, if no other first channel exists, a missing dependency for the blocked channel is confirmed. At 1314, it is checked for whether all blocked channels have been evaluated, wherein if all the blocked channels have not been evaluated, at 1316, the next blocked input interface channel is taken into consideration and the method is taken back to 1303 for evaluation of this next blocked input interface channel. At 1315, it is confirmed that no protocol level deadlock occurs and the method ends.

Figure 14:
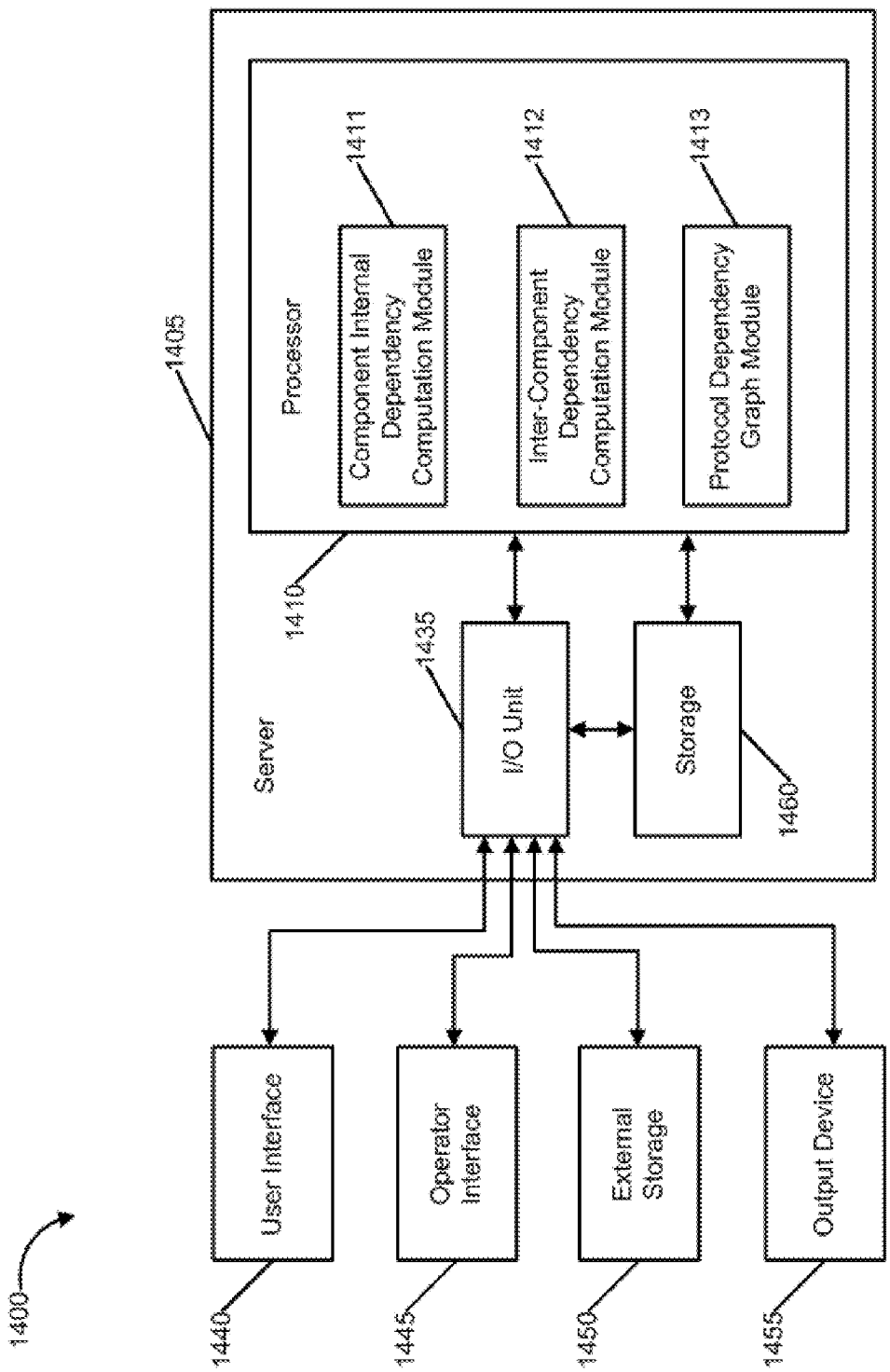
FIG. 14 illustrates an example computer system on which example implementations may be implemented.

FIG. 14 illustrates an example computer system 1400 on which example implementations may be implemented. The computer system 1400 includes a server 1405 which may involve an I/O unit 1435, storage 1460, and a processor 1410 operable to execute one or more units as known to one of skill in the art. The term "computer-readable medium" as used herein refers to any medium that participates in providing instructions to processor 1410 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include media such as carrier waves. The I/O unit processes input from user interfaces 1440 and operator interfaces 1445 which may utilize input devices such as a keyboard, mouse, touch device, or verbal command.

The server 1405 may also be connected to an external storage 1450, which can contain removable storage such as a portable hard drive, optical media (CD or DVD), disk media or any other medium from which a computer can read executable code. The server may also be connected an output device 1455, such as a display to output data and other information to a user, as well as request additional information from a user. The connections from the server 1405 to the user interface 1440, the operator interface 1445, the external storage 1450, and the output device 1455 may via wireless protocols, such as the 802.11 standards, Bluetooth® or cellular protocols, or via physical transmission media, such as cables or fiber optics. The output device 1455 may therefore further act as an input device for interacting with a user.

The processor 1410 may execute one or more modules. The component internal dependency computation module 1411 is configured to capture the internal dependencies within a component based on dependencies between incoming and outgoing interface channels. The specification of every core in the system is stored internally for protocol level deadlock analysis later. The inter-component dependency computation module 1412 is configured to capture dependencies between interfaces of two or more components of the system. As incoming and outgoing interface channels of components typically depend on each other to process system traffic, understand system level dependencies by assessing inter-component communications can help identify potential protocol level deadlocks. The protocol dependency graph module 1413 may be configured to take the global system traffic profile, component's internal dependency specifications, and multi-component communication dependencies as the input and automatically construct a dependency graph consisting of various nodes and edges representing various dependencies in the system. This module may check for cyclic dependencies in the dependency graph to determine whether the system may have protocol level deadlocks and may report them to the user.

The component internal dependency computation module 1411, the inter-component dependency computation module 1412, and the protocol dependency graph module 1413 may interact with each other in various ways depending on the desired implementation. For example, protocol dependency graph module 1412 may be utilized to notify deadlock scenarios to the users and the component internal dependency computation module 1411 may be used to capture impact of blocking one or more output interface channels on input interface channels of a component and then feed this impact and dependency relationships between channels back to the protocol dependency graph module 1413 for deadlock analysis. The inter-component dependency computation module 1412, on the other hand, may analyze blocked input interface channels after a deadlock has occurred to analyze and identify other channels on which each blocked input channel is dependent, if any, and determine if a cycle of blocked input channels is formed to conclude existence of a protocol level deadlock.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
   for a System on Chip (SoC) comprising a system component and a Network on Chip (NoC), the system component connected to the NoC, determining, through a computer system, an internal dependency specification to avoid blocking of the system component, the system component having multiple interface channels comprising multiple input interface channels and multiple output interface channels, the determining the internal dependency specification comprising:
   executing a simulation of a specification of the NoC on the computer system;
   manipulating one or more of the multiple interface channels interacting with the NoC during the simulation, and determining the internal dependency specification based on changes to remaining ones of the multiple interface channels;
   wherein the internal dependency specification is indicative of dependencies between the multiple interface channels of the system component.

2. The method of claim 1, wherein the manipulating the one or more of the multiple interface channels comprises blocking the one or more of the multiple interface channels.

3. The method of claim 2, wherein the determining the internal dependency specification based on the changes on the remaining ones of the multiple interface channels is based on identification of at least one of backpressure and traffic flow variation of the remaining ones of the multiple interface channels.

4. The method of claim 3, further comprising:
   mapping a dependency of the one or more of the multiple interface channels and blocked ones of the remaining ones of the multiple interface channels in the internal dependency specification, based on the identification.

5. The method of claim 1, further comprising:
   transmitting traffic messages from the multiple input interface channels to the multiple output interface channels before manipulating the one or more of the multiple interface channels of the system component.

6. The method of claim 5, further comprising mapping one or more dependencies between the one or more of the multiple interface channels and the remaining ones of the multiple interface channels in the internal dependency specification based on a traversal of the traffic messages through the system component.

7. The method of claim 1, further comprising:
   using internal dependency specifications of one or more system components operatively coupled with each other to identify an inter-component dependency communication specification, based on dependencies between interface channels of the one or more system components.

8. The method of claim 7, wherein the identifying the inter-component dependency communication specification is conducted when a deadlock in the SoC is detected.

9. The method of claim 7, wherein the identifying the inter-component dependency communication specification is conducted based on an interconnection between the interface channels across the one or more system components.

10. A non-transitory computer readable storage medium storing instructions for executing a process, the instructions comprising:
    for a System on Chip (SoC) comprising a system component and a Network on Chip (NoC), the system component connected to the NoC, determining an internal dependency specification to avoid blocking of the system component, the system component having multiple interface channels comprising multiple input interface channels and multiple output interface channels, the determining the internal dependency specification comprising:
    executing a simulation of a specification of the NoC;
    manipulating one or more of the multiple interface channels interacting with the NoC during the simulation, and determining the internal dependency specification based on changes to remaining ones of the multiple interface channels;
    wherein the internal dependency specification is indicative of dependencies between the multiple interface channels of the component.

11. The non-transitory computer readable storage medium of claim 10, wherein the manipulating the one or more of the multiple interface channels comprises blocking the one or more of the multiple interface channels.

12. The non-transitory computer readable medium of claim 11, wherein the determining the internal dependency specification based on the changes on the remaining ones of the multiple interface channels is based on identification of at least one of backpressure and traffic flow variation of the remaining ones of one or more of the multiple interface channels.

13. The non-transitory computer readable medium of claim 12, wherein the instructions further comprise:
mapping a dependency of the one or more of the multiple interface channels and blocked ones of the remaining ones of the multiple interface channels in the internal dependency specification, based on the identification.

14. The non-transitory computer readable medium of claim 10, wherein the instructions further comprise:
transmitting traffic messages from the multiple input interface channels to the multiple output interface channels before manipulating the one or more of the multiple interface channels of the system component.

15. The non-transitory computer readable medium of claim 14, wherein the instructions further comprise determining one or more dependencies between the one or more of the multiple interface channels and the remaining ones of the multiple interface channels based on a traversal of the traffic messages through the system component.

16. The non-transitory computer readable storage medium of claim 10, wherein the instructions further comprise:
using internal dependency specifications of one or more system components operatively coupled with each other to identify an inter-component dependency communication specification, based on dependencies between interface channels of the one or more system components.

17. The non-transitory computer readable storage medium of claim 16, wherein the identifying the inter-component dependency communication specification is conducted when a deadlock in the SoC is detected.

18. The non-transitory computer readable storage medium of claim 16, wherein the identifying the inter-component dependency communication specification is conducted based on an interconnection between the interface channels across the one or more system components.

* * * * *